United States Patent
Holle et al.

(10) Patent No.: US 11,310,233 B2
(45) Date of Patent: Apr. 19, 2022

(54) METHOD FOR AUTHENTICATING SMART GLASSES IN A DATA NETWORK

(71) Applicant: TEAMVIEWER GERMANY GMBH, Göppingen (DE)

(72) Inventors: Henrik Holle, Syke (DE); Hendrik Witt, Bremen (DE); Christoph Eggert, Bremen (DE)

(73) Assignee: TEAMVIEWER GERMANY GMBH, Göppingen (DE)

( * ) Notice: Subject to any disclaimer, the term of this patent is extended or adjusted under 35 U.S.C. 154(b) by 200 days.

(21) Appl. No.: 16/684,805

(22) Filed: Nov. 15, 2019

(65) Prior Publication Data

US 2020/0162459 A1    May 21, 2020

(30) Foreign Application Priority Data

Nov. 21, 2018  (EP) ..................... 18207595

(51) Int. Cl.
*H04L 29/06* (2006.01)
*H04W 12/06* (2021.01)

(52) U.S. Cl.
CPC ...... *H04L 63/0884* (2013.01); *H04L 63/0853* (2013.01); *H04L 63/0861* (2013.01);
(Continued)

(58) Field of Classification Search
CPC ............. H04L 63/0884; H04L 63/0853; H04L 63/0861; H04L 63/108; H04L 2463/082; H04W 12/06
(Continued)

(56) References Cited

U.S. PATENT DOCUMENTS 9,824,244 B1  11/2017  Hopkins, III
9,979,725 B1   5/2018  Liu et al.
(Continued)

FOREIGN PATENT DOCUMENTS

DE  102014011853 A1  2/2016
EP     3107022 A1   12/2016

OTHER PUBLICATIONS

Kirar et al., "An Efficient Architecture and Algorithm to Prevent Data Leakage in Cloud Computing using Multi-tier Security Approach", Proceedings of the SMART—2016, IEEE Conference, pp. 271-279 (Year: 2016).*
(Continued)

*Primary Examiner* — Khalil Naghdali
(74) *Attorney, Agent, or Firm* — Carter, Deluca & Farrell LLP

(57) ABSTRACT

A method for authenticating smart glasses in a data network includes transmitting a message to an authentication computer of the data network, generating a first transaction code and transmitting to the smart glasses, reading authorization data of a user, without involving the smart glasses, into the data network and processing by the authentication computer, which carries out an authentication of the user on the basis of the authorization data, and in case of a successful authentication, reading a second transaction code into the data network, wherein if a check performed by the authentication computer shows that the second transaction code matches the first, an access right is provided for the smart glasses and stored in the smart glasses, the access right enabling the smart glasses to access one or a plurality of predetermined services in the data network.

19 Claims, 1 Drawing Sheet

(52) U.S. Cl.
CPC ........... *H04L 63/108* (2013.01); *H04W 12/06* (2013.01); *H04L 2463/082* (2013.01)

(58) Field of Classification Search
USPC ............................................................ 726/4
See application file for complete search history.

(56) References Cited

U.S. PATENT DOCUMENTS

| | | |
|---|---|---|
| 2014/0310531 A1 | 10/2014 | Kundu et al. |
| 2016/0150406 A1 | 5/2016 | Vincent et al. |
| 2018/0019878 A1 | 1/2018 | Jiang |
| 2021/0027295 A1* | 1/2021 | Raquepaw .......... H04L 63/0861 |
| 2021/0194691 A1* | 6/2021 | Mars .................... H04L 9/0894 |

OTHER PUBLICATIONS

Mikula et al., 2018 21st Euromicro Conference on Digital System Design "Identity and Access Management with Blockchain in Electronic Healthcare Records", pp. 699-706 (Year: 2018).*

European Search Report issued in EP Appln. No. 18 20 7595 dated Apr. 23, 2019.

\* cited by examiner

METHOD FOR AUTHENTICATING SMART GLASSES IN A DATA NETWORK

CROSS REFERENCE TO RELATED APPLICATIONS

The present application claims the benefit of and priority to European Application No. 18 207 595.2, filed on Nov. 21, 2018, the entire contents of which is hereby incorporated in its entirety.

TECHNICAL FIELD

The invention relates to a method for authenticating smart glasses in a data network and to a corresponding authentication system.

BACKGROUND

Nowadays smart glasses are used in a plurality of technical application fields. Here and in the following, smart glasses are understood to mean a device worn on the head of a user, which has a communication interface for receiving and transmitting data and which furthermore comprises an output means for outputting information for the user. The output means is preferably a visual output means. This visual output means is preferably a projection module, which projects information on a transparent screen of the smart glasses in front of the user's eyes. However, as an alternative or additionally, the output means can also generate another kind of output, e.g., an audio output. Furthermore, smart glasses can optionally also have a detection device for detecting the surroundings (environment) in which the user with the smart glasses is moving. Preferably, a camera is used as a detection device.

Among other things, smart glasses are used in the course of order picking processes, in which a user receives information on stocks or instructions for the removal and/or deposition of objects. Smart glasses are also used in the field of user assistance, namely in the course of commissioning and/or inspection of technical equipment. In this process, the user receives instructions for operating the equipment from a remote location.

In order to be able to use smart glasses in a predetermined environment, usually an access needs to be granted for the smart glasses to services of a corresponding data network assigned to the predetermined environment. To do so, the user of the smart glasses must authenticate himself/herself in the data network in order to avoid unauthorized access to the data network. Smart glasses usually do not provide any or else only an inadequate user interface for carrying out such an authentication.

Documents U.S. Pat. No. 9,824,244 B1, US 2018/0019878 A1 and EP 3 107 022 A1 disclose authentication methods in which devices worn by the user (so-called wearables) are involved. In these methods, at least a portion of the authentication or authorization data is provided by the wearables.

It is an object of the invention to enable a straightforward authentication of smart glasses in a data network.

SUMMARY

This object is solved by the method according to claim 1 and by the authentication system according to claim 12. Preferred embodiments of the invention are defined in the dependent claims.

In the method according to the invention, steps a) through f) explained below are carried out. In step a), the smart glasses transmit a message to an authentication computer of the data network by means of a digital data transfer in the data network. Here and in the following, a digital data transfer is understood to mean a transfer exclusively via communication paths on which information is encoded as digital signals. The transmission of the message is preferably triggered by an operation (i.e., one or a plurality of operation actions executed by a user) performed on the smart glasses or on another communication device.

In step b) of the method according to the invention, the authentication computer generates a first transaction code in response to the transmitted message, and then transmits this code to the smart glasses by means of a digital data transfer in the data network. Preferably, the same transmission path as in step a) is used for step b).

In step c) of the method according to the invention, authorization data of a user are read into the data network, without involving the smart glasses, in response to a first operation performed on a terminal not associated with the smart glasses. The first operation and also the second operation mentioned further below comprise one or a plurality of operation actions executed by a user on the terminal. Preferably, an output, which prompts the user to perform the first operation on the terminal, is generated on the terminal. The authentication computer processes the read-in authorization data. In doing so, the authentication computer carries out an authentication of the user on the basis of the authorization data. A terminal is understood to mean a device, and preferably a stationary device, which comprises a corresponding user interface for operations performed by a user. In a preferred variant, the terminal is part of the authentication computer defined above. However, the authentication computer can also be a computer on which a terminal is not provided. In this case, the terminal communicates with the authentication computer via the data network.

In step d) of the method according to the invention, if the user authentication was successful, the terminal, in response to a second operation, reads a second transaction code into the data network, which code is provided to the authentication computer. Preferably, an output, which prompts the user to perform the second operation on the terminal, is generated on the terminal.

In step e), the authentication computer then checks whether the second transaction code matches the first transaction code. If this is the case, an access right is provided for the smart glasses by the authentication computer and stored in the smart glasses in step f), wherein the access right enables the smart glasses to access one or a plurality of predetermined services in the data network. The service or services can be of any kind. In one variant, a service can be a directory service, for example based on Microsoft Active Directory or LDAP (LDAP=Lightweight Directory Access Protocol).

The method according to the invention enables a so-called SSO (=Single Sign-On) authentication of smart glasses, according to which a one-time authentication of a user permits certain services in the data network to be used without re-authentication. To do so, the smart glasses merely have to provide the stored access right to the corresponding service. This access right is typically a so-called SSO token. Different variants of such tokens (e.g., SAML, jwt or OAuth), which can also be used in the course of the method according to the invention, are known from the prior art.

The method according to the invention has the advantage that a straightforward authentication of smart glasses is achieved by an intermediary operation performed on a terminal which is not associated with the smart glasses. In other words, the provision of authorization data is shifted from the smart glasses to another device. The linking of the authentication to the corresponding smart glasses is achieved with the aid of a transaction code, which is transmitted to the smart glasses.

The access right preferably comprises a preset validity period and/or a signature as information which must be checked when the access right of the smart glasses is used for accessing the predetermined service or services. In other words, access to the corresponding service is only granted if the preset validity period has not expired and/or if the signature can be successfully verified.

In a preferred variant of the method according to the invention, every data transmission in the data network between the smart glasses and the authentication computer takes place in an encrypted manner, wherein standard encryption methods can be used for this purpose. The security of the method is thus enhanced. Preferably, every digital data transfer between the smart glasses and the authentication computer in the data network takes place using a wireless communication unit of the smart glasses. In other words, a wireless communication path to and from the smart glasses is always used for data exchange with the smart glasses. This simplifies the method.

In another preferred embodiment, the first operation in step c) of the method according to the invention comprises a manual input of data by a user, wherein the user preferably uses a keyboard and/or manipulates a cursor on a screen for this purpose. The manually input data represent at least a portion of the read-in authorization data. A user-friendly input of authorization data is achievable with this variant of the invention. It is not mandatory that the keyboard consist of individually formed keys; instead it can also be provided (as a virtual keyboard) on a touch-sensitive screen. The manually input data preferably comprise a username and a password. The manually input can optionally comprise additional information, e.g., a domain.

In a further variant of the method according to the invention, the first operation in step c) comprises the provision of biometric data and/or data of a portable data carrier by a user, the provided biometric data or the provided data of a portable data carrier representing at least a portion of the read-in authorization data. The biometric data can be, for example, a user's finger print or face. These data can be read in using suitable sensor technology (fingerprint sensor, camera, and the like). For providing the data of a portable data carrier, the user allows the corresponding data carrier to communicate with the terminal via a contactless or contact-based interface.

In order to improve the security of the method, the authorization data can be provided in the course of a multi-factor authentication known per se. In this authentication, use is made of a plurality of independent authentication methods, for example a password known to the user and a code provided on a separate terminal device.

In a further, particularly preferred embodiment, the first transaction code is output in step b) on the smart glasses for a user via an output means, in particular a visual and/or audio output means, wherein in step d) the second operation is a manual user input of a code, which is read into the data network as a second transaction code. In other words, a user can obtain access to the services by means of the smart glasses by entering, in the course of the second operation, the transaction code output by the output means. A particularly simple authentication of the smart glasses is thus achieved. However, the first transaction code may also be stored in a memory of the smart glasses, wherein this memory, triggered by a corresponding second operation, is read, e.g. by connecting the smart glasses to a (contactless or contact-based) interface on the terminal.

In a variant of the method according to the invention, the authentication computer transmits the access right to the smart glasses via a digital data transfer in the data network in step f). As an alternative, the access right may be output on the terminal as an analog code, wherein said output analog code is digitized and stored in the smart glasses. The analog code is preferably a visual code, which is digitized by scanning. The scanning is preferably performed by a detection device of the smart glasses, e.g., a camera. The visual code is preferably a QR code known per se.

In addition to the method described above, the invention relates to an authentication system for a data network, said system comprising smart glasses, an authentication computer and a terminal, which are configured such that, in operation in the data network, they carry out the method according to the invention or one or several preferred variants of the method according to the invention.

The invention furthermore relates to an apparatus for authenticating smart glasses, said apparatus comprising an authentication computer and a terminal, wherein the authentication computer and the terminal are configured to function as authentication computer and terminal, respectively, in the method according to the invention or in one or several preferred variants of the method according to the invention.

The invention furthermore comprises smart glasses, which are configured to function as the smart glasses in the method according to the invention or in one or several preferred variants of the method according to the invention.

BRIEF DESCRIPTION OF THE DRAWINGS

In the following, embodiments of the invention are described in detail with reference to the appended figures.

DETAILED DESCRIPTION

In the following, a variant of the method according to the invention is described with respect to smart glasses 1, which are used by a user U wishing to obtain access to predetermined services SE of a data network 4. The data network 4 is only indicated schematically in FIG. 1 by a dashed circle. In the embodiment shown here, the smart glasses 1 comprise, in addition to a wireless communication unit via which it is possible to communicate with the data network 4, a visual output unit via which information is displayed for the user by means of a projection onto the lenses of the smart glasses.

The data network 4 is a closed IT infrastructure. For example, it can be a network of the operator of a technical facility, wherein the user U wishes to have access to certain components of the facility or to corresponding information of these components by means of the smart glasses. In one variant, the technical facility can be an inventory management system, in which the user deposits objects in or removes them from corresponding storage places in the course of order picking. The user can obtain information on corresponding stocks or instructions for the removal and deposition of objects via the smart glasses 1.

In order for the user U to be able to use his/her smart glasses 1 for corresponding services, he/she must first successfully authenticate or authorize himself/herself in the data network 4 for the smart glasses 1. According to the invention, this authentication is carried out via a terminal 3 rather than via a user interface of the smart glasses 1. In the embodiment described here, the terminal 3, which is only indicated schematically, is a screen and a keyboard via which the user U can enter data manually.

An authentication computer 2 which is associated with the data network 4 is also involved in the authentication. The terminal 3 is a component of the authentication computer 2 in the embodiment described here, although this is not mandatory. Instead, it is also possible for the authentication computer to be a computer other than the computer on which the terminal 3 is provided. In this case, the terminal 3 and the authentication computer 2 can communicate with each other via the data network 4.

Figure 1:
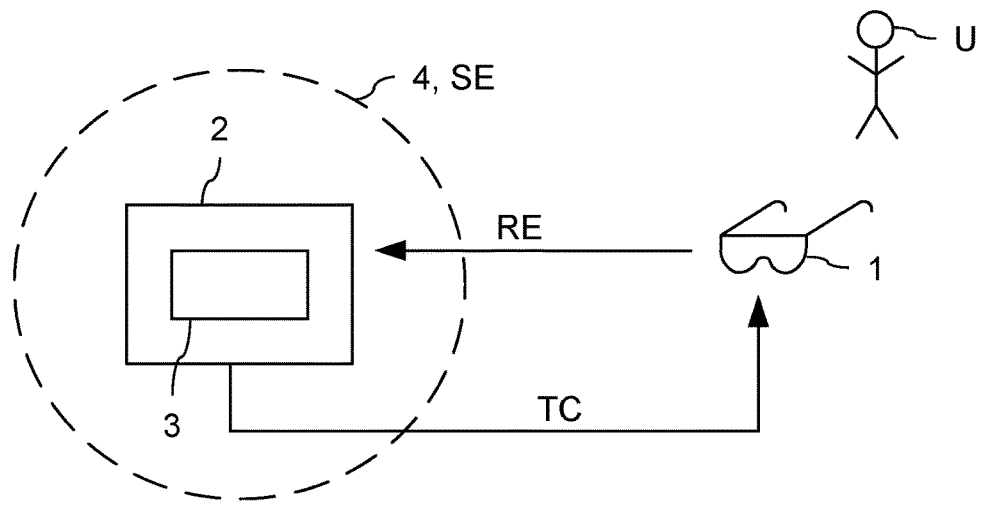
FIGS. 1 to 3 are schematic representations, which illustrate the procedure of a variant of the method according to the invention.

The user U starts the authentication process on the smart glasses 1, for example by pressing a button on the glasses. A message RE is then sent wirelessly by the smart glasses 1 and transmitted to the authentication computer 2, as shown in FIG. 1. With this message, a transaction code or transaction token TC is requested from the authentication computer 2. As a consequence, the authentication computer 2 transmits the transaction code TC via the data network 4 to the smart glasses 1 so that this transaction code is received wirelessly by the smart glasses (see FIG. 1).

The transaction code is then displayed via the visual output unit of the smart glasses 1. In the embodiment described here, the transaction code consists of a predetermined number of characters, which can contain letters and/or numbers. For example, the transaction code can be a six-digit numeric code. The transaction code serves as a temporary unique feature of the specific authorization or authentication process being carried out by the user for the smart glasses 1 and is needed for the transmission of an access right to the smart glasses, as described further below with reference to FIG. 3.

Figure 2:
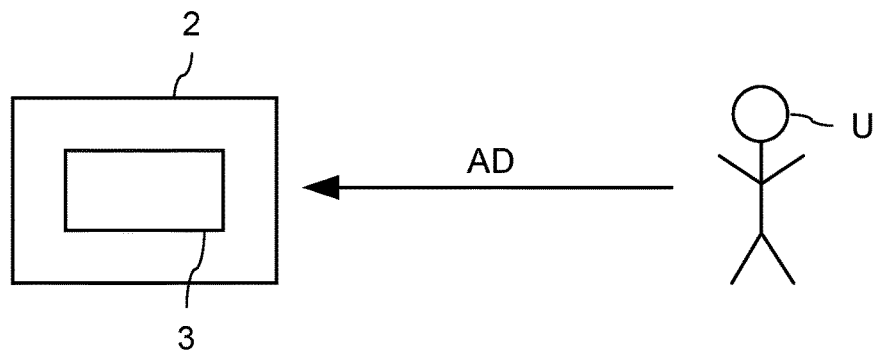

After the transmission of the transaction code TC to the smart glasses 1, the user U switches to the terminal 3 of the authentication computer 2, as shown in FIG. 2. There he/she is prompted to input authorization data or authorization features AD. For example, the combination of a domain, a username and a password can constitute these features. The user U uses the keyboard of the terminal 3 to enter the authorization data AD manually. A user-friendly user interface can thus be used for inputting this authorization data. The smart glasses 1 are not equipped with such a user-friendly user interface.

The authentication computer 2 then carries out an authentication on the basis of the authorization data AD that have been entered. For example, a check is performed to determine whether the correct password was entered for an entered domain and an entered username. The authorization data can optionally include further authorization features; for example, it may be necessary to read additional authorization data from a smartcard assigned to the user. Furthermore, the authentication can be configured as a multi-factor authentication, in which further authentication or authorization features are received via an independent device. In the course of a two-factor authentication, it may e.g. be necessary to input a code in the terminal in addition, the code being transmitted during the authentication and being displayed on a mobile terminal device of the user.

If the authentication of the user U is successful, the authentication computer 2 automatically generates in the background a so-called SSO token, which is also referred to as an SSO ticket. The token can be based on technologies known per se, e.g., SAML, jwt or OAuth. The token initially remains with the authentication computer 2.

Figure 3:
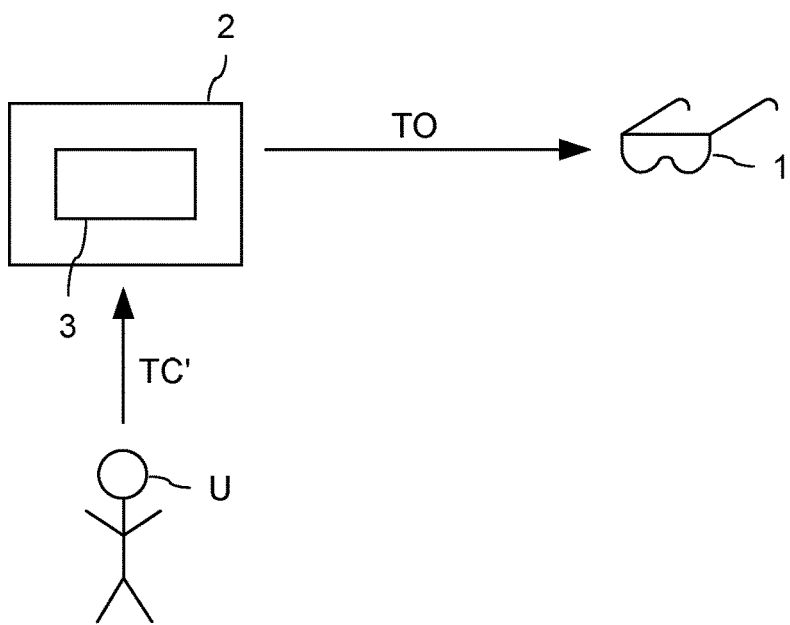

In a subsequent step shown in FIG. 3, after successful authentication, the user U is prompted to enter a transaction code TC', also by means of the keyboard of the terminal 3. The SSO token is transmitted to the smart glasses 1 only if the transaction code TC' matches the transaction code TC outputted visually on the smart glasses 1. The token enables access to predetermined services SE of the data network 4. If the user wishes to use such a service, he/she initiates the transmission of the token TO stored on the smart glasses to the corresponding service, which then verifies the token. The service can be used after successful verification.

In the embodiment of FIG. 3, the token TO is transferred in digital form via the data network 4. As an alternative, it is also possible to display the token TO on the screen of the terminal 3, whereupon it is digitized by scanning and provided to the smart glasses. For example, the code can be displayed on the screen as a QR code, whereupon the user scans the QR code using a camera of the smart glasses. In the smart glasses, the scanned code is then converted into corresponding digital data.

The embodiment of the invention described in the foregoing has a number of advantages. In particular, an authentication of a user for the smart glasses assigned to him/her can be performed on a separate terminal, without having to use a user interface of the smart glasses. A user-friendly input of authorization data is achievable in this manner. In other words, the input of authorization data is shifted from the smart glasses to another device in the form of a terminal, wherein the authorization data are assigned to the smart glasses by inputting a transaction code, which was output on the smart glasses beforehand.

The invention claimed is:

1. A method for authenticating smart glasses in a data network, comprising:
    transmitting a message by the smart glasses to an authentication computer of the data network by a digital data transfer in the data network;
    generating and transmitting by the authentication computer, in response to the transmitted message, a first transaction code to the smart glasses by a digital data transfer in the data network;
    receiving, in response to a first operation performed on a terminal not associated with the smart glasses, authorization data of a user, which is not inputted by the smart glasses; into the data network, without involvement of the smart glasses, and
    processing the authorization data of the user by the authentication computer, which carries out an authentication of the user on the basis of the authorization data;
    receiving, by the authentication computer, in a case of a successful authentication of the user, a second transaction code, which is not inputted by the smart glasses, in response to a second operation performed on the terminal; and
    checking by the authentication computer whether the second transaction code matches the first transaction code; and
    if the checking shows that the second transaction code matches the first transaction code;

providing an access right for the smart glasses by the authentication computer; and storing the access right in the smart glasses, wherein the access right enables the smart glasses to access one or a plurality of predetermined services in the data network.

2. The method according to claim 1, wherein the access right comprises a preset validity period or a signature as information which must be checked when the access right of the smart glasses is used to access the predetermined service or services.

3. The method according to claim 1, wherein the transmitting of the message is triggered by an operation performed on the smart glasses or on another communication device.

4. The method according to claim 1, wherein every digital data transfer in the data network between the smart glasses and the authentication computer takes place in an encrypted manner or using a wireless communication unit of the smart glasses.

5. The method according to claim 1, wherein the first reading receiving the authorization data comprises receiving data manually input by the user, via a keyboard or manipulation of a cursor on a screen, and wherein the manually input data represent at least a portion of the authorization data.

6. The method according to claim 1, wherein receiving the authorization data comprises receiving biometric data or data of a portable data carrier by the user, and wherein the received data represent at least a portion of the authorization data.

7. The method according to claim 1, wherein the authorization data are provided in a course of a multi-factor authentication.

8. The method according to claim 1, wherein generating the first transaction code includes outputting the first transaction code on the smart glasses for the user, and wherein the second operation is a manual input of a code, which is read into the data network as the second transaction code.

9. The method according to claim 1, wherein the authentication computer is a computer on which the terminal is provided.

10. The method according to claim 1, wherein the authentication computer transmits the access right to the smart glasses via a digital data transfer in the data network.

11. The method according to claim 1, wherein the access right is output on the terminal as an analog code, wherein the analog code is digitized and stored in the smart glasses, and wherein the analog code is a visual code, which is displayed on the terminal and digitized by scanning.

12. An authentication system for a data network, comprising:

smart glasses;

an authentication computer; and a terminal, wherein the authentication system is configured to, when operating in the data network, perform a method comprising:

transmitting a message by the smart glasses to the authentication computer of the data network by a digital data transfer in the data network;

generating and transmitting by the authentication computer, in response to the transmitted message, a first transaction code to the smart glasses by a digital data transfer in the data network;

receiving, in response to a first operation performed on a terminal not associated with the smart glasses, authorization data of a user, which is not inputted by the smart glasses;

processing the authorization data of the user by the authentication computer, which carries out an authentication of the user on the basis of the authorization data;

receiving, by the authentication computer, in a case of a successful authentication of the user, a second transaction code, which is not inputted by the smart glasses, in response to a second operation performed on the terminal; and checking by the authentication computer whether the second transaction code matches the first transaction code; and if the checking shows that the second transaction code matches the first transaction code;

providing an access right for the smart glasses by the authentication computer; and storing the access right in the smart glasses, wherein the access right enables the smart glasses to access one or a plurality of predetermined services in the data network.

13. The system according to claim 12, wherein the access right comprises a preset validity period or a signature as information which must be checked when the access right of the smart glasses is used to access the predetermined service or services.

14. The system according to claim 12, wherein the transmitting is triggered by an operation performed on the smart glasses or on another communication device.

15. The system according to claim 12, wherein every digital data transfer in the data network between the smart glasses and the authentication computer takes place in an encrypted manner or using a wireless communication unit of the smart glasses.

16. The system according to claim 12, wherein receiving the authorization data comprises receiving data manually input by the user, via a keyboard or manipulation of a cursor on a screen, and wherein the manually input data represent at least a portion of the authorization data.

17. The system according to claim 12, wherein receiving the authorization data comprises receiving biometric data or data of a portable data carrier by the user, and wherein the received data represent at least a portion of the authorization data.

18. The system according to claim 12, wherein generating the first transaction code includes outputting the first transaction code on the smart glasses for the user, and wherein the second operation is a manual input of a code, which is read into the data network as the second transaction code.

19. An apparatus for authenticating smart glasses, comprising:

an authentication computer configured to receive a message from smart glasses by a digital data transfer in a data network, and to generate and transmit, in response to the received message, a first transaction code to the smart glasses by a digital data transfer in the data network; and a terminal configured to perform a first operation and a second operation, the terminal not being associated with the smart glasses, wherein the authentication computer is further configured to:
   receive, in response to the first operation by the terminal, authorization data of a user, which is not inputted by the smart glasses;
   process the authorization data of the user to carry out an authentication of the user on the basis of the authorization data;
   receive, in a case of a successful authentication of the user, a second transaction code, which is not inputted by the smart glasses, in response to the second operation;
   check whether the second transaction code matches the first transaction code; and if it is checked that the second transaction code matches the first transaction code:
      provide an access right for the smart glasses; and
      store the access right in the smart glasses,
wherein the access right enables the smart glasses to access one or a plurality of predetermined services in the data network.

\* \* \* \* \*